United States Patent Office 2,955,122
Patented Oct. 4, 1960

2,955,122

PROCESS FOR PREPARING A LUBRICANT AND COMPOSITION RESULTING THEREFROM

Arthur C. Whitaker, Pittsburgh, Pa., assignor to Gulf Research & Development Company, Pittsburgh, Pa., a corporation of Delaware No Drawing. Filed Nov. 22, 1957, Ser. No. 698,058

8 Claims. (Cl. 260—410.9)

This invention relates to a process for preparing lubricants and more particularly to a process for preparing lubricants from by-products of the Oxo process. This invention also relates to the product resulting from such process.

The production of oxygenated organic compounds by reaction of olefins with hydrogen and carbon monoxide in the Oxo process is of course well known. In the first stage of the process, equal molar amounts of an olefin, such as heptene, carbon monoxide and hydrogen are reacted in the presence of a metallic hydroformylation reaction catalyst, such as cobalt 2-ethyl hexanoate, at a temperature of about 150° to about 450° F. and a pressure of about 1500 to about 5000 pounds per square inch for a period of about 10 to about 60 minutes to obtain a hydroformylation reaction product predominating in an aldehyde having one more carbon than the olefin in the charge. Generally the hydroformylation reaction product obtained is then treated to remove therefrom the dissolved hydroformylation reaction catalyst, which at such point is in the form of a metal carbonyl such as cobalt carbonyl. This can be effected, for example, by the mere expedient of heating the hydroformylation reaction product to a temperature of about 200° to about 400° F. and a pressure of about 150 to about 250 pounds per square inch and thereby decomposing the metal carbonyl. After the metal carbonyl has been removed from the hydroformylation reaction product, it is sent to a hydrogenation reactor packed with a hydrogenation catalyst, such as nickel, where at a temperature of about 400° to about 500° F. and a pressure of about 500 to about 1500 pounds per square inch the aldehyde in the hydroformylation reaction product is converted to the corresponding alcohol.

Not only are aldehydes and alcohols produced in the Oxo process, but many other organic compounds which cannot easily be recovered as separate entities are also produced. Thus in the hydroformylation reaction zone, polymerization and decomposition products, ketones, acetals, hemiacetals and esters are produced in addition to the desired aldehydes. When the hydrogenation product containing the alcohols is subjected to distillation with open reboiler steam at a temperature of about 100° to about 500° F. and a pressure of about one to about 20 pounds per square inch absolute, an overhead product consisting of the desired alcohol is obtained and a bottom fraction comprising the ordinarily undesirable products noted about is left behind. The latter fraction, called "Oxo bottoms," which in many cases amounts to about two to about 15 percent by weight of the charge to the distillation zone, is generally of little commercial value.

I have found that Oxo bottoms can be rendered commercially attractive and a product comprising a lubricant having a remarkably low pour point can be obtained therefrom by the expedient of partially oxidizing the same to obtain a product containing alcohols and acids and thereafter reacting said alcohols with said acids to obtain an esterified mixture which can be used to prepare such lubricant.

As charge stock for the reaction, that part of the hydrogenation product obtained in the Oxo process remaining as bottoms after recovery of the desired alcohol fraction can be employed, desirably the bottoms remaining after distillation of the alcohol product obtained in accordance with the Oxo process wherein the olefin charged to the hydroformylation reaction stage is a $C_6$ to $C_{16}$ olefin. Oxo bottom products having the following analysis can satisfactorily be used in the present process:

| $C_n$ Compounds: | Percent by weight |
|---|---|
| Alcohol | 2–25 |
| $C_{2n}$ Compounds: | |
| Aldehyde | 2–10 |
| Alcohol | 10–25 |
| Ester | 2–10 |
| Ether | 2–10 |
| Hemiacetal | 2–10 |
| Aldol | ≦1 |
| Ketoaldehyde | 0–5 |
| Glycol | 2–15 |
| Acid | ≦5 |
| $C_{3n}$ Compounds: | |
| Aldehyde | ≦3 |
| Ester | 2–15 |
| Diether | 2–10 |
| Higher molecular weight compounds | ≦20 |

Wherein $n=7$ to 17.

The initial oxidation of the Oxo bottoms product to obtain a product predominating in fatty acids and alcohols is extremely critical and important. The yield of esters produced in the subsequent reaction is a function of the extent of oxidation, the yield increasing as oxidation increases up to about 40 to about 60 percent, preferably about 50 percent yield, and then falling off, since further oxidation will degrade the acid material and destroy some of the alcoholic material. Under such conditions the acids will constitute about 20 to about 40 percent by weight of the final product and the alcohols about 35 to about 55 percent by weight. The preferred oxidizing agent is a gas containing molecular oxygen, such as air, with the amount of oxygen being about 0.03 to about 0.06 gram of oxygen per gram of Oxo bottoms per hour. Other mild oxidizing agents which can be used include solutions of nitric acid having a concentration of about 40 to about 60 percent, for example, in an amount of about 100 to about 200 percent by weight based on the Oxo bottoms, chromic acid, or potassium permanganate. A temperature of about 110° to about 160° C., preferably about 130° to about 140° C., and a pressure of about 80 to about 500 pounds per square inch gauge, preferably about 100 to about 200 pounds per square inch gauge can be used. The reaction can be completed in the desired manner in about 4 to about 9 and preferably in about 6 to about 7 hours. The product at this point will have the following analysis:

| $C_n$ Compounds: | Percent by weight |
|---|---|
| Acid | 5–40 |
| Alcohol | 10–55 |
| $C_{2n}$ Compounds: | |
| Acid | 5–40 |
| Alcohol | 10–55 |
| Hydroxyacid | <20 |
| Hemiacetal | <20 | wherein $n=7$ to 17.

The product obtained after oxidation is thereafter treated in a manner such that the carboxyl and hydroxyl groups therein react with each other to form a product predominating in esters. In carrying out the reaction care should be exercised in removing the water from the reaction zone in order that an equilibrium not be reached. Desirably the water can be removed in vapor form, and to this end the esterification reaction can be carried out at a temperature of about 110° to about 175° C., although the temperature can be from about 60° C. to the boiling point of the charge to the esterification reactor in the event that suitable means is used to remove the water. For example, to carry out the esterification at 60° C., ethyl isopropyl ether could be added to the reactant charge. The ethyl isopropyl ether would carry off water as an azeotrope to a suitable condenser from which water would be discarded and ethyl isopropyl ether returned to the reaction vessel. The pressure can be about 100 millimeters of mercury to about 50 pounds per square inch gauge. While the esterification reaction can be carried out in the absence of a catalyst, preferably, in order to speed the course of the reaction, about 0.2 to about 1.5 percent by weight of an esterification catalyst such as para-toluene sulfonic acid or sulfuric acid can be employed. A period of about one to about 3 hours is sufficient to complete the esterification reaction. The product obtained is a complex mixture, the bulk of which comprises esters produced from both mono and polyfunctional alcohols and acids as well as unreacted alcohols, acetals and hemiacetals.

The product obtained above, itself satisfactory as a lubricating agent, has been found to be satisfactory as an intermediate in the preparation of improved lubricants. Particularly effective as a lubricant, in that it possesses a remarkably low pour point, is that portion of the esterified product boiling between about 180° to about 400° C. (190° to about 210° C. in the event a $C_7$ olefin has been used in the hydroformylation reaction) at a pressure of about one to about 2 millimeters of mercury having the following specification:

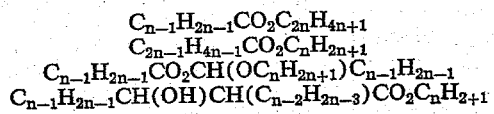

and

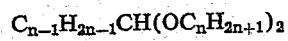

wherein $n = 7$ to 17.

The invention can further be illustrated by reference to the following example.

*Example I*

32 standard cubic feet per hour of hydrogen and carbon monoxide in a molar ratio of 1.1 to 1 were passed together with 0.475 gallon per hour of heptene and 0.046 pound per hour of the cobalt salt of 2-ethylhexanoic acid through an elongated coil having an internal diameter of 0.302 inch and a length of 365 feet which was maintained under a pressure of 3500 pounds per square inch gauge and a temperature of 350° F. At the end of 45 minutes a product containing 55 percent by weight of isooctylaldehyde contaminated with the cobalt carbonyl catalyst was obtained. This product was subsequently heated to a temperature of 380° F. to decompose and remove the dissolved cobalt carbonyl, and the substantially metal-free product together with 90 standard cubic feet per hour of hydrogen was passed to a hydrogenation tower having a height of 11.5 feet and an internal diameter of 1.6 inches and packed with nickel in particulate form. The temperature therein was 400° F. and the pressure about 1000 pounds per square inch. At the end of 60 minutes 1600 grams of a hydrogenation product was obtained. This product was distilled at a temperature of 330° F. and a pressure of 14.7 pounds per square inch continuously and 1520 grams of an overhead product consisting of isooctyl alcohol and 80 grams of a residue fraction having the following analysis were obtained.

| | Percent by weight |
|---|---|
| Eight carbon compounds: | |
| Isooctyl alcohol | 27.2 |
| Sixteen carbon compounds: | |
| Isohexadecyl aldehyde | 6.3 |
| Isohexadecyl alcohol | 18.8 |
| Isooctyl isooctanoate | 3.6 |
| Diisooctyl ether | 5.6 |
| Hemiacetal | 5.2 |
| Aldol | 0.3 |
| Ketoaldehyde | 1.4 |
| Glycol | 8.3 |
| Isohexadecanoic acid | 0.3 |
| Twenty-four carbon compounds: | |
| Isotetracosyl aldehyde | 0.6 |
| Ester | 7.8 |
| Diether | 3.8 |
| High boiling polymers | 6.3 |

136.3 grams of the Oxo bottoms defined above were placed in a cylindrical reactor together with one gram of manganese naphthenate and treated, over a period of 6½ hours, with 5.38 cubic feet of air at 135° C. and 100 pounds per square inch gauge. The effluent vapors were led to a condenser and removed from the reaction zone. The product remaining in the reactor was filtered, and to it was added one gram of para-toluene sulfonic acid. This was then heated at atmospheric pressure and at 110° C. initially, the temperature being raised over a period of approximately 2 hours to 175° C. During the reaction 5.5 grams of water was evolved; it was condensed and collected. The product, amounting to 95 grams, remaining was washed with an equal volume of 10 percent aqueous sodium hydroxide and is believed to comprise the following compounds:

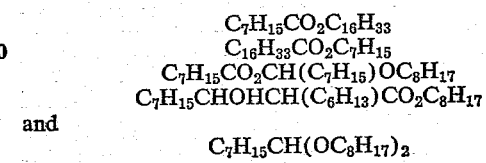

and $$C_7H_{15}CH(OC_8H_{17})_2$$

The esterified product above has lubricating properties and is an excellent intermediate in preparing a lubricant having a remarkably low pour point. Thus 97 grams of the product was distilled into three cuts as follows:

| | Grams |
|---|---|
| Cut No. 1 to 180° C. at 20 mm. | 44.8 |
| Cut No. 2 to 190° C. at 2 mm. | 28.5 |
| Cut No. 3 190° to 206° C. at 2 mm. | 13.6 |
| Residue | 4.1 |

Cut No. 3, above, which is an excellent lubricant, was found to have lubricity to the touch and analyzed to have the following characteristics: viscosity at 210° F. was 3.59 centistokes and at 100° F. was 20.95 centistokes (ASTM D445) and the pour point was below −75° F. (ASTM D97–47). Lubricants having the viscosities found will produce excellent results in service. The pour point of −75° F. is extremely low and exceeds the specification for most lubricants used at low temperatures which require a pour point of at least −65° F.

While the results set forth above were obtained using Oxo bottoms wherein the olefin used in the hydro-formylation reaction stage was heptene, it is apparent that similar results will be obtained using Oxo bottoms resulting from the hydroformylation of other olefins and the subsequent hydrogenation of the hydroformylation reaction product obtained.

Obviously, many modifications and variations of the invention, as hereinabove set forth, can be made without departing from the spirit and scope thereof, and therefore only such limitations should be imposed as are indicated in the appended claims.

I claim:

1. A process for producing a lubricant composition from Oxo bottoms remaining after alcohol production wherein the olefin employed in the hydroformylation reaction stage had from 6 to 16 carbon atoms which comprises subjecting said Oxo bottoms to oxidation for a time sufficient to oxidize about 40 to about 60 percent of said Oxo bottoms and obtain an oxidation mixture comprising acids and alcohols, and thereafter reacting said acids and said alcohols at a temperature of about 60° C. to the boiling point of said mixture while the same are in said mixture.

2. A process for producing a lubricant composition from Oxo bottoms remaining after alcohol production wherein the olefin employed in the hydroformylation reaction stage had from 6 to 16 carbon atoms which comprises subjecting said Oxo bottoms to oxidation for a time sufficient to oxidize about 40 to about 60 percent of said Oxo bottoms and obtain an oxidation mixture comprising acids and alcohols, reacting said acids and alcohols at a temperature of about 60° C. to the boiling point of said mixture while the same are in said mixture, and thereafter separating from said mixture a cut boiling between about 180° to about 400° C. at a pressure of about 1 to about 2 millimeters of mercury.

3. A process for producing a lubricant composition from Oxo bottoms remaining after alcohol production wherein the olefin employed in the hydroformylation reaction stage was heptene which comprises subjecting said Oxo bottoms to oxidation for a time sufficient to oxidize about 40 to about 60 percent of said Oxo bottoms and obtain an oxidation mixture comprising acids and alcohols, and thereafter reacting said acids and said alcohols at a temperature of about 60° C. to the boiling point of said mixture while the same are in said mixture.

4. A process for producing a lubricant composition from Oxo bottoms remaining after alcohol production wherein the olefin employed in the hydroformylation reaction stage was heptene which comprises subjecting said Oxo bottoms to oxidation for a time sufficient to oxidize about 40 to about 60 percent of said Oxo bottoms and obtain an oxidation mixture comprising acids and alcohols, reacting said acids and alcohols at a temperature of about 60° C. to the boiling point of said mixture while the same are in said mixture, and thereafter separating from said mixture a cut boiling between about 180° to about 400° C. at a pressure of about 1 to about 2 millimeters of mercury.

5. The composition resulting from the process of claim 1.

6. The composition resulting from the process of claim 2.

7. The composition resulting from the process of claim 3.

8. The composition resulting from the process of claim 4.

References Cited in the file of this patent

UNITED STATES PATENTS

| | | |
|---|---|---|
| 2,594,341 | Owen et al. | Apr. 29, 1952 |
| 2,796,441 | Mertzweiler | June 18, 1957 |

OTHER REFERENCES

Lubrication Engineering, August 1957, pages 454–458.

UNITED STATES PATENT OFFICE

CERTIFICATE OF CORRECTION

Patent No. 2,955,122                      October 4, 1960

Arthur C. Whitaker

It is hereby certified that error appears in the printed specification of the above numbered patent requiring correction and that the said Letters Patent should read as corrected below.

Column 3, line 43, for that portion of the specification reading "$C_nH_{2+1}$" read -- $C_nH_{2n+1}$ --; column 4, lines 67 and 68, for "hydro-formylation" read -- hydroformylation --.

Signed and sealed this 11th day of April 1961.

(SEAL)
Attest:

ERNEST W. SWIDER
Attesting Officer

ARTHUR W. CROCKER
Acting Commissioner of Patents